United States Patent [19]
Woll

[11] 3,865,398
[45] Feb. 11, 1975

[54] EXPANDABLE CRASH-RESTRAINING MEANS

[76] Inventor: Toni Woll, 12912 N.E. 30th, Bellevue, Wash. 98004

[22] Filed: Feb. 5, 1973

[21] Appl. No.: 329,602

[52] U.S. Cl...... 280/150 AB, 280/150 SB, 297/386, 297/389
[51] Int. Cl. ............................................. B06r 21/10
[58] Field of Search................ 280/150 AB, 150 SB; 9/316–322; 244/121 B, 151 R; 297/386, 389

[56] References Cited
UNITED STATES PATENTS

| | | | |
|---|---|---|---|
| 2,202,415 | 5/1940 | Christopher | 9/316 |
| 2,850,082 | 9/1958 | Day | 280/150 SB |
| 3,104,403 | 9/1963 | Lortz | 9/322 |
| 3,218,103 | 11/1965 | Boyce | 280/150 SB X |
| 3,414,326 | 12/1968 | Raffaelli | 280/150 SB X |
| 3,430,979 | 3/1969 | Terry | 280/150 AB |
| 3,638,258 | 2/1972 | Black | 9/316 |
| 3,679,228 | 7/1972 | Settimi | 280/150 SB |
| 3,682,498 | 8/1972 | Rutzski | 280/150 AB |

Primary Examiner—Kenneth H. Betts

[57] ABSTRACT

Vehicle safety apparatus is disclosed for use to restrain passengers from being displaced from their seats in the vehicle upon the occurrence of severe or unusual pitch or roll of the vehicle. Compactly folded, expandable body-restraining straps, suitably anchored within the vehicle structure, are inflated or expanded by the pressure of released gasses. The straps are arranged to provide protective and restraining pneumatic pillow elements across the lower body between the thighs and the lower torso, and over one or, preferably, both shoulders alongside the head. The inflatable or expandable straps are formed as a gas-impervious-member in the shape of tubes which, when collapsed, are longitudinally folded to compact strap-like configuration for normal use as a simple body-restraining strap means.

5 Claims, 11 Drawing Figures

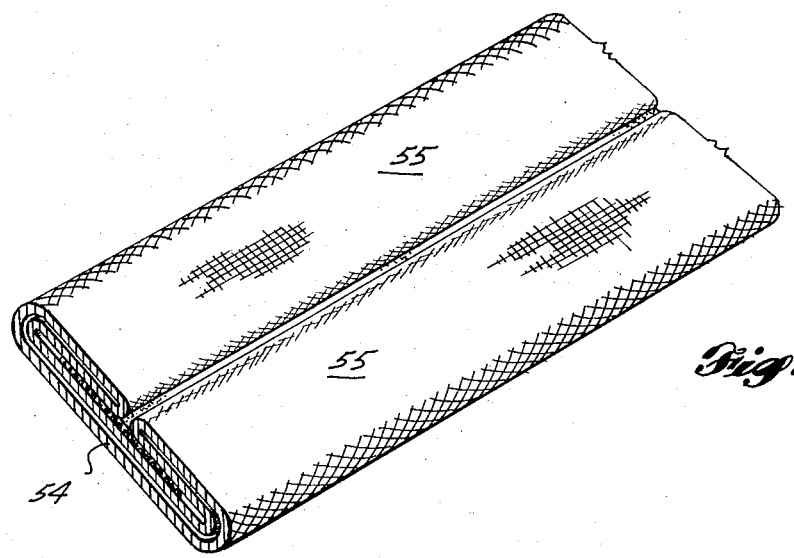
Fig. 7
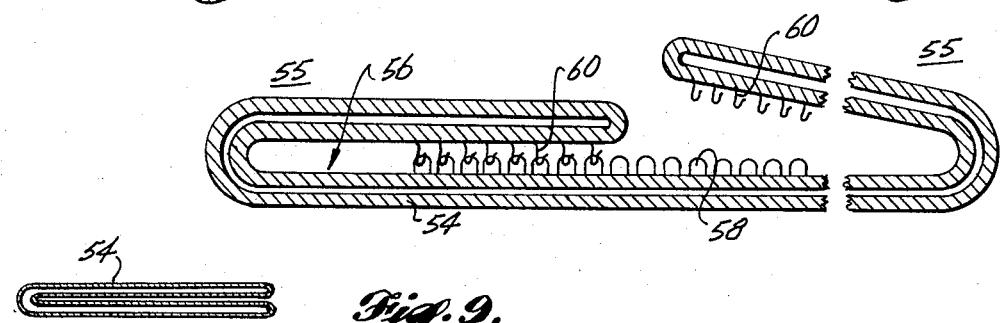
Fig. 8
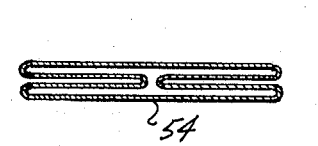
Fig. 9
Fig. 10
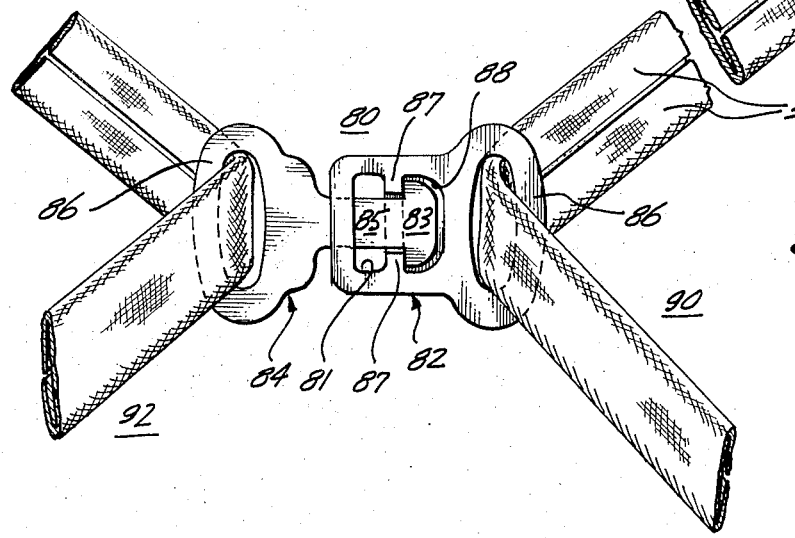
Fig. 11

EXPANDABLE CRASH-RESTRAINING MEANS

BACKGROUND OF THE INVENTION

Numerous and various body-restraining safety devises for use in vehicles have been developed or are under development. Those which have received the greatest acceptance, and have been widely installed in automobiles, are primarily seat belts of both the lap and shoulder variety. Straps provide a significant measure of protection, to the extent that they restrain the vehicle passenger against rapid and damaging movement relative the structure of the vehicle in front of them when severe deceleration or pitching or rolling occurs. For example, often such occurs when the vehicle is braked violently or it crashes into a relatively immovable object such as another vehicle, bridge structure, or the like. However, the simple lap belt strap structure known in the art is not capable of restraining jack-knifing of the passenger's torso or upper body toward the thighs. It often happens that even with a shoulder strap such jack-knifing can occur. This exposes the passenger to having his head severely injured by striking, in the case of the driver the steering wheel, or in the case of both the driver or seated passengers the forward panel structure or other body elements. Also upon the occurrence of a severe impact there are passenger-jolting forces present which tend to slap the passengers about sideways or angularly and subjects them to severe head damage caused by striking the windows and posts of the vehicle structure. It is considered highly desirable that automatically actuated strap-like body-restraining means to be made available which not only effectively maintain the occupant or passenger in his seat in the event of a collision, sudden deceleration or pitching or rolling, but prevents his body from jack-knifing and his head from being slapped around to his injury. It is the main object of this invention therefore to provide restraining means of this character.

SUMMARY OF THE INVENTION

It has been determined that the foregoing primary object of the invention, and others which will become more apparent during the course of the following description, can be satisfied by the provision of an individual safety seat belt, separable in the mid-portion to extend across the lap of an occupant passenger in a vehicle and cooperatively associated with a shoulder strap or straps which extend in generally upward and rearward directions across the chest and shoulder of the occupant passenger to a point overhead where they are anchored in the vehicle. The straps are hollow, tubular, gas-impervious flexible members which are normally deflated and collapsed into a flat configuration. In order that in their inflated condition these hollow straps be sufficiently large to provide functionally effective pillows when inflated their widths in the normally deflated and collapsed condition will be unsuitably great for comfort. The collapsed tubular members are therefore longitudinally folded upon themselves, either in outer-edge-to-outer-edge disposition, or in H-shaped arrangement, or with the outer edges infolded to a median position. Preferably easily separable inter-engaging and retaining means are provided between adjacent surfaces of the folded strap structure to keep the same neatly and tightly in strap-like configuration, but to release when gas has been introduced into the interiors and the same are inflated or expanded.

To provide for inflation of the strap members, gas flows from a supply vessel or generator, being released upon impact of the predetermined force on the vehicle, or the assumption of an unusual angle. A sensing means controls a valve element from the gas source into a conduit system appropriately associated with each of the inflatable strap-like elements.

Normally the inflated pillows derived from the strap-like elements will remain inflated until the vehicle has come to rest and danger to the occupant passengers has ended. However, it will be apparent to those skilled in the art that the pillow-like elements may be inflated almost instantly, somewhat in the manner of the airbag restraining structures well known to the art, and then deflated rapidly to remove the restraining influence as soon as danger has passed.

A particular advantage of the arrangement of this invention is that the volume of gas in the restraining strap/pillows is relatively small, and the simultaneous inflation of them in the vehicle does not give rise to appreciable increase in the overall pressure within the vehicle, which is a problem of considerable magnitude encountered with the airbag systems.

Invention in this instance is believed to reside in constructional features of the inflatable straps as well, in the configuration of the straps with respect to the body of the passenger occupant, and in the mode and manner in which the straps are attached and anchored within the vehicle, permitting relative adjustment for the comfort and safety of the passenger occupant at points of anchor to vehicle structure in distinction to the more conventional adjustable buckle systems provided with a usual safety seat belt or shoulder belt, near the center of the body.

In the accompanying drawings and in the following description is disclosed a preferred and certain alternative forms of the invention. It will be understood that these are by way of illustration only, and that various changes, alterations and modifications may be made with the contemplation of this invention and within its scope in accordance to the claims appended hereto.

THE DRAWINGS

FIG. 7 is an enlarged perspective view of a collapsed portion of the gas-impervious inflatable strap-like element used in this vehicular occupant restraining apparatus;

FIG. 8 is an enlarged cross-section of the strap-like element of FIG. 7 detailing the preferred infolded arrangement when collapsed;

FIGS. 9 and 10 schematically show alternate infolded configurations; and

FIG. 11 is a face view of separable buckle means for the inflatable body-restraining strap-like elements.

DESCRIPTION OF PREFERRED EMBODIMENT

Figure 1:
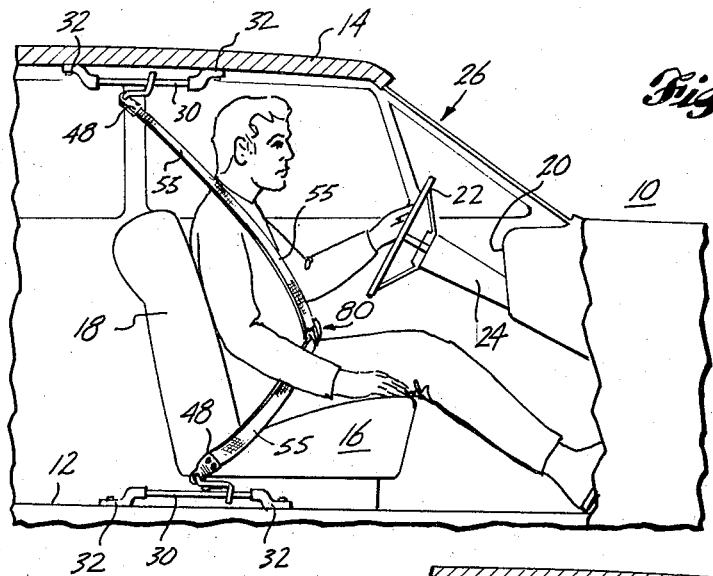
FIGS. 1 and 2 are side views showing a vehicle passenger secured in his seat by the apparatus of this invention.
Figure 2:
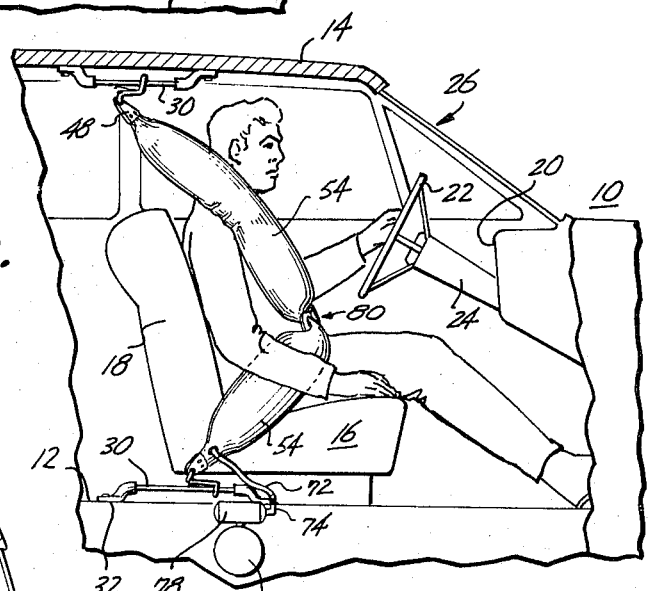
Figure 3:
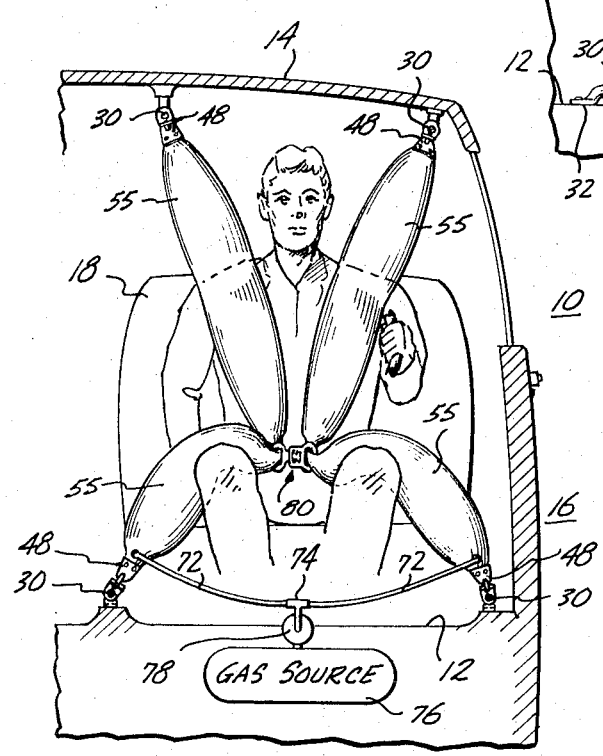
FIG. 3 is a front view of a passenger secured in his seat.

Referring to FIGS. 1, 2 and 3 there is schematically shown a broken away portion of a motor vehicle 10 having a floor 12, a roof 14, a passenger seat 16 provided with a back 18. In front of the driver and passenger is the conventional instrument panel or dashboard 20. The driver is shown behind the usual steering wheel 22 on column 24. A windshield is indicated as 26.

At each side of the seat on the floor, and at each side on the overhead structure is mounted a rod 30 by means of offset end mounts 32 which are attached securely, in a fore and aft alignment within the vehicle 10, by bolts passed through holes 34.

Figure 4:
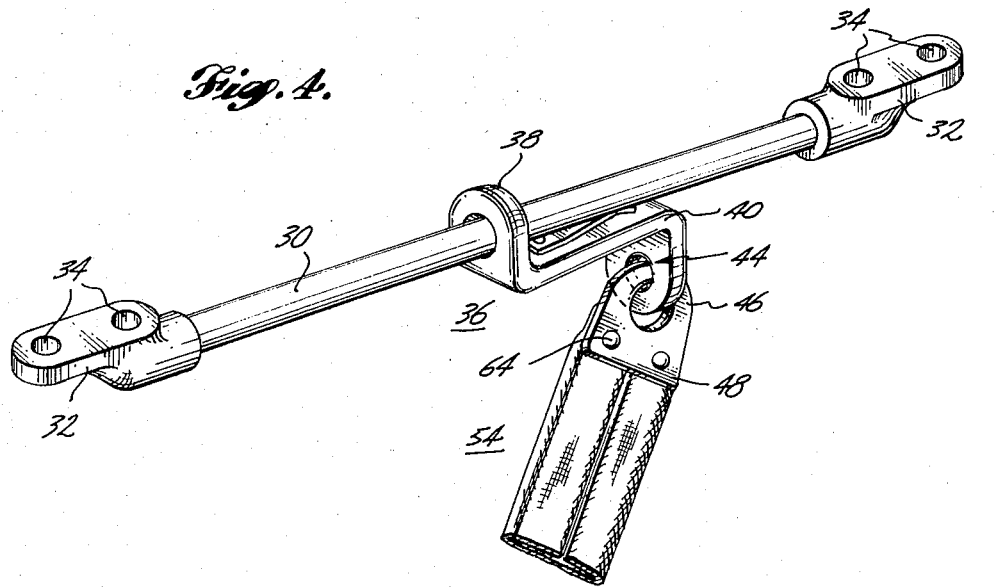
FIG. 4 is a perspective view of an overhead or upper adjustable strap anchor.
Figure 5:
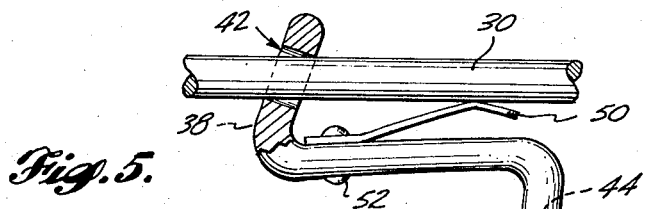
FIG. 5 is a side view of the strap anchor of FIG. 4.
Figure 6:
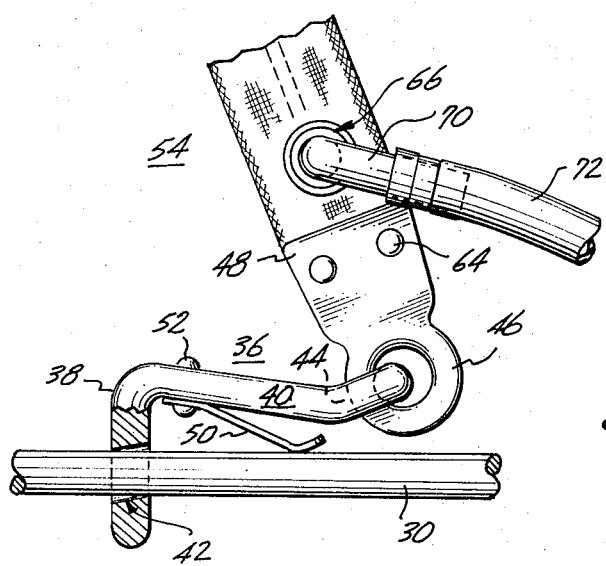
FIG. 6 is a side view of a lower strap anchor.

Each rod 30 receives a rugged L-shaped traveler 36 comprising the foot 38, slidable on rod 30, and the arm 40. Foot 38 has a hole 42 slightly larger than the diameter of rod 30 to permit foot 38 to slide freely along the rod when its location is to be varied. Hole 42 is preferably at a slightly non-perpendicular angle relative the plane of foot 38. When foot 38 is tilted relative the axis of rod 30 opposite end edges of hole 42 tend to bite into or frictionally engage rod 30. Such tilting occurs when there is a pull exerted on the outer end of arm 40, downward in FIGS. 4 and 5 and upward in FIG. 6. Each arm 40 has a hole 44 to receive the eye 46 of strap fitment 48. A leaf spring 50 secured by rivet 52 is disposed between each arm 40 and its related rod 30 and tends to maintain foot 38 tilted to maintain the traveler in any adjusted position along the length of the rod.

At each side of a person to be secured in a vehicle is an end-anchored elongated strap-like, restraining element. The several forms, shown in FIGS. 7 – 10, essentially comprise a collapsed and infolded gas-impervious tube 54 which is inflatable. The preferred infolded form is shown in FIGS. 7 and 8 in which, in deflated condition, the lateral margins 55 of tube 54 are infolded parallel to the length so that the two side edges meet in the middle of the inner face 56. A strip of loop-pile 58 is secured to face 56 and strips of hook-pile 60 are attached between the juxtaposed inner faces of margins 55. When the pile elements 58 and 60, 60 are pressed together the many hook-pile elements engages with the loop-pile and form secure but easily releasable retaining means maintaining the fairly wide inflatable tube 54 in strap-like configuration.

In FIG. 9 the tube 54 is folded along its axis. In FIG. 10 the margins of tube 54 are reversed inward in H-shape and disposed between the opposed face portions. In either configuration the hook-pile and loop-pile securing means as described may be used.

Each end of a tube 54 is closed and securely gripped in a fitment 48 by means of rivets 64. At one end, preferably near the floor, each tube has a gas inlet coupling 66 from which extends nipple 70 to which is attached conduit or hose 72. A pair of hoses 72 extend under the seat toward each other (see FIG. 3) and are joined by tee fitting 74 into a tube-inflation system which includes a gas source 76 and a sensor 78 responsive to deceleration or unusual angles.

Sensor 78 is usually best mounted close to vessel 76 and takes the form of conventional sensing devices to detect that the vehicle is involved in an impact with another object. Such sensor 78 may also be of the conventional type for sensing pitch and roll to enable the present invention to be activated upon the vehicle assuming an unusual attitude such as nose down or nose up, or sideways rolling without necessarily involving impact. Such sensor includes valve means which open to permit gas to flow from gas source 76 through conduit hoses 72 to the tubes 54 to unfold and inflate the same about the user.

The gas source 76 may be either a pressure storage system for compressed gas or it may be a gas generating system. These are of conventional nature and details are therefore not set forth. The important consideration in a gas operated inflation system for passenger restraint is instantaneous operation including the flow of a substantial volume of gas upon the sensor being activated.

In FIG. 11 is shown buckle means 80 by which the strap elements at each side of a person are secured together in the X-shaped arrangement of FIG. 3. Means 80 comprises receiver portion 82 and tongue portion 84, each of which includes an elongated ring 86. Tongue 85 on portion 84 has an enlarged head 83 which is introduced from the rear through opening 81 and then rocked to substantial alignment with knobs 87 disposed between opening 81 and the cavity 88 in receiver portion. Obviously other forms of buckle means suitable for joining two members for quick release may be substituted.

The left retaining strap 90 is passed through ring 86 on member 82 and angularly folded as shown. Similarly strap 92 passes through the ring 86 of tongue member 84 and is oppositely folded. In this way despite the change of direction continuity within tube 54 is insured so that as gas enters through coupling 66 it may flow the full length of the strap to form pillows about the user's waist and alongside the head as seen in FIG. 3.

From the foregoing it will be apparent that upon the occurance of any force to which the sensor is responsive, gas released or gas generated at gas source 76 will flow into conduits 72 thence into restraining straps to form tubular pillows. During normal operation of the vehicle absent any critical crash forces when the restraining straps 90 and 92 are not inflated the user will only be loosely embraced in the X-shaped system and quite comfortable.

What is claimed is:

1. Vehicular occupant-passenger apparatus inflatable by the flow of pressurized gas from a gas source as triggered by sensor means responding to a predetermined rate of deceleration of the vehicle, or to pitch and roll forces applied to such vehicle, comprising:

an end-anchored, occupant-restraining strap-like element at each side of a seat in a vehicle to be disposed in front of the body of an occupant seated in a vehicle;

each said element being anchored at one end to the floor adjacent said seat and at the other end to the overhead above the occupant;

buckle means intermediate the ends of said elements to be engaged in front of the body of an occupant to form said occupant-restraining elements into X-shape relative the front of the occupant's body;

at least one end-anchor of each of said elements including locking means longitudinally adjustable in respect to the vehicle permitting selective variance of the tightness of said elements upon the occupant's body; and each said element being an elongated inflatable tubular member in communication with said gas source, said inflatable tubular member being normally deflated, collapsed and longitudinally folded upon itself.

2. The apparatus of claim 1 in which the end-anchors of both ends of each said occupant-restraining elements is longitudinally shiftable in respect of such vehicle.

3. The apparatus of claim 1 in which there are interengaging retaining means between surfaces of said tubular member juxtaposed to each other when said element is longitudinally folded upon itself.

4. The apparatus of claim 1 in which the interengaging retaining means comprise hook-pile strip on one of said juxtaposed surfaces and a matching strip of loop-pile on the opposite of said juxtaposed surfaces.

5. The apparatus of claim 1 in which the longitudinally adjustable locking means comprises an elongated rod mounted to said vehicle in fore-and-aft alignment and a traveller slides along said rod, said traveller including means to frictionally engage said rod when the associated element is tightened about the occupant's body.

* * * * *